US008628185B1

(12) United States Patent
Hale et al.

(10) Patent No.: US 8,628,185 B1
(45) Date of Patent: Jan. 14, 2014

(54) PRINTING PROCESS AND INK FOR HEAT ACTIVATED COLORANTS

(71) Applicant: Sawgrass Technologies, Inc., Mt. Pleasant, SC (US)

(72) Inventors: Nathan Hale, Mt. Pleasant, SC (US); Ming Xu, Malvern, PA (US); Kimberlee Thompson, Atlanta, GA (US); Sukun Zhang, Mt. Pleasant, SC (US)

(73) Assignee: Sawgrass Technologies, Inc., Mt. Pleasant, SC (US)

( * ) Notice: Subject to any disclaimer, the term of this patent is extended or adjusted under 35 U.S.C. 154(b) by 0 days.

(21) Appl. No.: 13/777,743

(22) Filed: Feb. 26, 2013

Related U.S. Application Data

(63) Continuation of application No. 12/639,029, filed on Dec. 16, 2009, now Pat. No. 8,398,224, which is a continuation of application No. 12/625,038, filed on Nov. 24, 2009, now Pat. No. 8,337,006, which is a continuation of application No. 11/113,663, filed on Apr. 25, 2005, now Pat. No. 7,654,660.

(60) Provisional application No. 60/658,528, filed on Mar. 4, 2005.

(51) Int. Cl.
*B41J 2/01* (2006.01)

(52) U.S. Cl.
USPC .................. 347/100; 347/95; 347/102

(58) Field of Classification Search
USPC ............ 347/100, 95, 96, 99, 88, 102, 101; 106/31.13, 31.6, 31.27; 523/160, 161
See application file for complete search history.

(56) References Cited

U.S. PATENT DOCUMENTS

| | | | |
|---|---|---|---|
| 4,021,591 A | 5/1977 | DeVries et al. | |
| 4,058,644 A | 11/1977 | DeVries et al. | |
| 4,078,886 A | 3/1978 | DeFago et al. | |
| 4,097,229 A | 6/1978 | Koller et al. | |
| 4,167,392 A | 9/1979 | DeFago et al. | |
| 4,171,202 A * | 10/1979 | Sideman et al. | 106/31.06 |
| 4,224,358 A | 9/1980 | Hare et al. | |
| 4,357,441 A | 11/1982 | Hamamura et al. | |
| 4,420,307 A | 12/1983 | Gorondy | |
| 4,421,515 A | 12/1983 | Gorondy | |
| 4,421,517 A | 12/1983 | Gorondy | |
| 4,549,824 A | 10/1985 | Sachdev et al. | |
| 4,589,920 A | 5/1986 | Kanada et al. | |
| 4,605,418 A | 8/1986 | Christie et al. | |
| 4,664,670 A | 5/1987 | Mehl et al. | |
| 4,681,828 A | 7/1987 | Alexandrovich et al. | |
| 4,694,302 A | 9/1987 | Hackleman et al. | |
| 4,725,849 A | 2/1988 | Koike et al. | |
| 4,730,021 A | 3/1988 | Zom et al. | |
| 4,732,616 A | 3/1988 | Kondo et al. | |
| 4,749,784 A | 6/1988 | Freeman et al. | |
| 4,750,935 A | 6/1988 | Prochaska et al. | |
| 4,773,953 A | 9/1988 | Hare | |
| 4,847,318 A | 7/1989 | Dennis | |
| 4,849,262 A | 7/1989 | Uhl et al. | |
| 4,849,770 A | 7/1989 | Koike et al. | |
| 4,874,798 A | 10/1989 | Koleske et al. | |
| 4,968,575 A | 11/1990 | Matsumura et al. | |
| 5,009,982 A * | 4/1991 | Kamayachi et al. | 430/280.1 |
| 5,035,970 A | 7/1991 | Hsieh et al. | |
| 5,092,757 A | 3/1992 | Stein et al. | |
| 5,112,715 A | 5/1992 | DeMejo et al. | |
| 5,116,712 A | 5/1992 | Nakamura et al. | |
| 5,149,367 A | 9/1992 | Reuter et al. | |
| 5,196,030 A | 3/1993 | Akerblom et al. | |
| 5,246,518 A | 9/1993 | Hale | |
| 5,248,363 A | 9/1993 | Hale | |
| 5,250,121 A | 10/1993 | Yamamoto et al. | |
| 5,270,363 A | 12/1993 | Kluger et al. | |
| 5,302,223 A | 4/1994 | Hale | |
| 5,313,885 A | 5/1994 | Winston | |
| 5,326,622 A | 7/1994 | Yamane et al. | |
| 5,328,754 A | 7/1994 | Yuyama et al. | |
| 5,350,423 A * | 9/1994 | Davis et al. | 8/401 |
| 5,380,769 A | 1/1995 | Tittertington et al. | |
| 5,411,931 A | 5/1995 | Kung | |
| 5,418,018 A | 5/1995 | Rudder et al. | |

(Continued)

FOREIGN PATENT DOCUMENTS

| | | |
|---|---|---|
| DE | 2727223 | 12/1978 |
| EP | 87303687.5 | 11/1987 |

(Continued)

OTHER PUBLICATIONS

High Technology Applications of Organic Colorants, Plenum Press, NY, P. Gregory (1991).

(Continued)

*Primary Examiner* — Manish S Shah
(74) *Attorney, Agent, or Firm* — B. Craig Killough; Barnwell Whaley Patterson & Helms, LLC

(57) ABSTRACT

A reactive ink for printing. A reagent in the ink reacts with a second reagent. A resultant product of the reaction of said first reagent with said second reagent is a polymeric material that is present on the substrate. A heat activated colorant or colorants, such as a sublimation dyes, are applied to the substrate. The heat activated dye has an affinity for the polymeric material, and the heat activated dye binds to the polymeric material upon heat activation of said heat activated dye.

12 Claims, No Drawings

(56) References Cited

U.S. PATENT DOCUMENTS

| | | | |
|---|---|---|---|
| 5,429,841 | A | 7/1995 | Batlaw et al. |
| 5,431,501 | A | 7/1995 | Hale et al. |
| 5,470,818 | A | 11/1995 | Nakamura et al. |
| 5,471,234 | A | 11/1995 | Katano et al. |
| 5,522,317 | A | 6/1996 | Hale et al. |
| 5,534,052 | A | 7/1996 | Mennicke et al. |
| 5,537,137 | A * | 7/1996 | Held et al. .................. 347/105 |
| 5,542,972 | A | 8/1996 | von der Eltz et al. |
| 5,556,935 | A | 9/1996 | Traubel et al. |
| 5,558,969 | A | 9/1996 | Uyttendaele et al. |
| 5,563,195 | A | 10/1996 | Namba et al. |
| 5,575,877 | A | 11/1996 | Hale et al. |
| 5,607,482 | A | 3/1997 | Reiff et al. |
| 5,612,119 | A | 3/1997 | Olsen et al. |
| 5,640,180 | A | 6/1997 | Hale et al. |
| 5,643,709 | A | 7/1997 | Kamio et al. |
| 5,644,988 | A | 7/1997 | Xu et al. |
| 5,645,888 | A | 7/1997 | Titterington et al. |
| 5,646,090 | A | 7/1997 | Tamura et al. |
| 5,650,805 | A | 7/1997 | Shimomura et al. |
| 5,665,676 | A | 9/1997 | Nakamura et al. |
| 5,679,198 | A | 10/1997 | Olsen et al. |
| 5,718,793 | A | 2/1998 | Inamoto et al. |
| 5,725,646 | A | 3/1998 | Krishnan et al. |
| 5,748,204 | A | 5/1998 | Harrison |
| 5,764,263 | A * | 6/1998 | Lin .................. 347/102 |
| 5,778,789 | A | 7/1998 | Krishnan et al. |
| 5,785,790 | A | 7/1998 | Olsen et al. |
| 5,853,861 | A | 12/1998 | Heid |
| 5,886,091 | A | 3/1999 | Harris et al. |
| 5,891,950 | A | 4/1999 | Collins et al. |
| 5,902,387 | A | 5/1999 | Suzuki et al. |
| 5,919,592 | A | 7/1999 | Yaguchi et al. |
| 5,958,561 | A | 9/1999 | Held |
| 5,981,077 | A | 11/1999 | Taniguchi |
| 5,985,503 | A | 11/1999 | de Beeck et al. |
| 6,009,297 | A | 12/1999 | Madeda et al. |
| 6,017,636 | A | 1/2000 | Tada et al. |
| 6,020,054 | A | 2/2000 | Masuda et al. |
| 6,028,178 | A | 2/2000 | Metz et al. |
| 6,040,269 | A | 3/2000 | Imoto et al. |
| 6,042,641 | A | 3/2000 | Justice |
| 6,068,797 | A | 5/2000 | Hunt |
| 6,074,794 | A | 6/2000 | Fushimi et al. |
| 6,078,773 | A | 6/2000 | Shimojo et al. |
| 6,095,628 | A | 8/2000 | Rhome |
| 6,096,475 | A | 8/2000 | Hare et al. |
| 6,099,625 | A | 8/2000 | Bradbury et al. |
| 6,103,041 | A * | 8/2000 | Wagner et al. ............... 156/230 |
| 6,103,042 | A | 8/2000 | Hatada et al. |
| 6,103,441 | A | 8/2000 | Tomita et al. |
| 6,105,502 | A | 8/2000 | Wagner et al. |
| 6,139,939 | A | 10/2000 | Haruta |
| 6,143,454 | A | 11/2000 | Thompson |
| 6,146,769 | A | 11/2000 | Anton |
| 6,184,268 | B1 | 2/2001 | Nichols et al. |
| 6,232,369 | B1 | 5/2001 | Ma |
| 6,262,152 | B1 | 7/2001 | Fryd |
| 6,270,933 | B1 | 8/2001 | Thompson |
| 6,306,994 | B1 | 10/2001 | Donald et al. |
| 6,341,856 | B1 | 1/2002 | Thompson et al. |
| 6,398,358 | B1 | 6/2002 | Miyake et al. |
| 6,402,313 | B1 | 6/2002 | Xu et al. |
| 6,443,569 | B1 | 9/2002 | Mheidle |
| 6,631,985 | B2 | 10/2003 | Koizumi et al. |
| 6,893,488 | B2 * | 5/2005 | Arndt .................. 106/31.03 |
| 2003/0176532 | A1 | 9/2003 | Chung et al. |
| 2004/0041894 | A1 | 3/2004 | Martin et al. |
| 2004/0182273 | A1 | 9/2004 | Sawada et al. |
| 2004/0252173 | A1 | 12/2004 | Ben-Zur |

FOREIGN PATENT DOCUMENTS

| | | |
|---|---|---|
| EP | 466 503 | 1/1992 |
| EP | 93309425.2 | 6/1994 |
| EP | 940103892.9 | 9/1994 |
| EP | 624 682 | 11/1994 |
| EP | 633 346 | 1/1995 |
| EP | 95115241.2 | 4/1996 |
| EP | 1 333 071 | 8/2003 |
| GB | 2 105 735 | 3/1983 |
| GB | 2 159 971 | 12/1985 |
| GB | 2 399 094 | 9/2004 |
| JP | 52-82509 | 7/1977 |
| JP | 58-152073 | 9/1983 |
| JP | 59067453 | 10/1985 |
| JP | 62103062 | 4/1987 |
| JP | 63-296982 | 12/1988 |
| JP | 01238984 | 9/1989 |
| JP | 2002194958 | 8/1990 |
| JP | 62-22686 | 8/1994 |
| JP | 332242 | 12/1994 |
| JP | 82-02064 | 8/1996 |
| JP | 200038533 | 2/2000 |
| JP | 2000-0247013 | 12/2000 |
| JP | 2003096342 | 4/2003 |
| JP | 2003213164 | 7/2003 |
| JP | 200329880 | 10/2003 |
| JP | 08100380 | 5/2008 |
| WO | 90-13063 | 11/1990 |
| WO | 92/00852 | 1/1992 |
| WO | 95-21739 | 8/1995 |
| WO | 96/06729 | 3/1996 |
| WO | 96-21570 | 11/1996 |
| WO | 99/56948 | 11/1999 |
| WO | PCT/US99/09387 | 11/1999 |
| WO | WO 9956948 | 11/1999 |
| WO | 00/03080 | 1/2000 |
| WO | 00/15898 | 3/2000 |
| WO | 00/20218 | 4/2000 |
| WO | 00/64681 | 11/2000 |
| WO | 01/73186 | 10/2001 |
| WO | 01/98091 | 12/2001 |
| WO | 2004/035911 | 4/2004 |
| WO | WO2004106443 | 12/2004 |

OTHER PUBLICATIONS

The Theory of Coloration of Textiles, Society of Dyers and Colourists, West Yorkshire, England, Second Edition, A., Johnson Editor (1989).

LB Schein, Electrography and Development Physics, Springer Series in Electrophysics, 14 Springer-Verlag (1988).

Robert Ulichney, Digital Halftoning, the MIT Press, 1990.

* cited by examiner

PRINTING PROCESS AND INK FOR HEAT ACTIVATED COLORANTS

Applicant claims the benefit of U.S. Provisional Application Ser. No. 60/658,528 filed Mar. 4, 2005.

This application is a continuation of application Ser. No. 12/639,029, filed Dec. 16, 2009, which is a continuation of application Ser. No. 12/625,038, filed Nov. 24, 2009, now U.S. Pat. No. 8,337,006 issued Dec. 25, 2012, which is a continuation of application Ser. No. 11/113,663, filed on Apr. 25, 2005, now U.S. Pat. No. 7,654,660 issued Feb. 2, 2010, which is a non-provisional application of Provisional Application Ser. No. 60/658,528 filed Mar. 4, 2005.

FIELD OF THE INVENTION

This invention relates to printing processes generally and is more specifically related to a method of printing an image using a reactive printing ink.

BACKGROUND OF THE INVENTION

Known printing methods and processes for imaging substrates other than paper suffer from a lack of printing intensity and durability due to fibrillation problems. Images can be "washed out" through both the laundering and attrition of daily exposure of use, especially the substrates are textile or fabric materials. Fibrillation is a term that the textile industry used to describe small lint of fibers break loose from the fabric material and remain on to the very surface of the fabric or textile, resulting in a substantial decrease of color intensity. Fibrillation exists in knitted, woven, or non-woven fabric textile materials when natural fibers such as cellulose or modified cellulose fibrous are used at least as part of the fabric textile.

Pigments or dyes used in many printing processes are either opaque or are in a mixture of opaque binding materials. They provide good opacity, but a high level of image or color vividness is absent. This problem is heightened when cotton or similar natural fibers materials are used in the textile substrate, due to the opacity nature of the materials. Accordingly there remains a need for a digital printing process that provides permanent fixing of the image onto a fibrous natural or synthetic substrate, and provides good colorfastness, color vividness and color vibrancy, permanency and satisfactory 'hand'.

The use of computer technology allows substantially instantaneous printing of images. For example, video cameras or scanners may be used to capture a color image on a computer. Images created or stored on a computer may be printed on command, without regard to run size. The image may be printed onto substrates from the computer by any suitable printing means capable of printing in multiple colors, including mechanical thermal printers, ink jet printers and electrophotographic or electrostatic printers.

SUMMARY OF THE PRESENT INVENTION

The present invention relates to printing. More specifically, the present invention is directed to reactive inks and methods of generating an image on a substrate using a reactive and energy-activated ink. An image is printed on a substrate, without reacting the reagents in the ink. Subsequently, the reagents are reacted to fix the image to a substrate, with substantial permanency and fastness. The ink may, or may not, comprise a colorant. The colorant may be printed in the form of an image by means of an additional printing step. Sublimation or similar heat activated dyes are printed with the reactive ink or as a separate printing step. The sublimation or similar heat activated dyes are activated, and have an affinity for polymer that is present on the substrate.

DETAILED DESCRIPTION OF THE PREFERRED EMBODIMENT

In a preferred embodiment of the present invention, a toner or ink is produced comprising components selected from each of two groups of reactive species. The ink or toner may further comprise one or more colorants, carriers, or print additives.

The first reactive species may be an electrophilic cross-linking agent that is capable of cross-linking nucleophilic compounds. The preferred cross-linking agents are isocyanates, diisocyante including 4,4'-methylenediphenyl diisocyanate (MDI), 2,4-, 2,6-toluene diisocyante (TDI), 1,5-naphthalene diisocyanate (NDI), 1,6-hexamethylene (HDI), 4,4'-dicyclohexylmethane diisocyante ($H_{12}$MDI), 3-isocyanatomethyl-3,5,5-trimethylcycloshexyl isocyanate or isophorone diisocyanate (IPDI), para-phenylene diisocyante, cyclohexyl diisocyanate, 2,2,4-trimethyl-1,6-hexamethylene diisocyanate (TMDI), 3,3'-tolidene-4,4'-diisocyanate, 3,3'-dimethyl-diphenylmethane-4,4'-diisocyanate, isothiocyanates, carbodiimide and polycarbodiimide, triazine and aminotriazine such as methoxymethyl melamine cross-linking agent, aziridine and polyfunctional azridine, polyacrylamide, acetoacetoxy-functional polymeric crosslinking agent, melamine resins such as trimethoxymethylmelamine (TMMM), hexamethoxymethylmelamine (HMMM) or other modified melamine resins such as acrylated melamine, benzoguanamine, urea crosslinking resins, reactive silane or reversibly protected silane (RPS), cyclic polycarboxylic acid or anhydride, carbonate such as alkylene carbonate including ethylene-, propylene, butylenes, glycerine-, hydroxyethyl- and hydroxypropyl-carbonate, or epoxy groups available for reaction through certain initiation processes, such as blocked polyisocyanates, internally blocked (sometimes referred to as blocking agent-free) isocyanate or polyisocyanates, or encapsulated polyisocyanates, which may be initiated by the application of heat. Other ingredients, such as colorants, dispersants, binders, surface active agents and other additives may also function as nucleophilic/electrophilic reactive compounds for fixation.

The second reactive species may be a nucleophilic compound capable of being cross-linked through active hydrogen containing groups, such as amine or diamine, amido, dicyandiamide compound, imine and polyethyleneimine, amine polyether, polyvinylalcohol (PVA), carboxylic acid, hydroxyl-containing such as diol, triol, polyol including polyester polyol, acrylate polyol, styrene allyl alcohol (SAA) copolymer polyol, multifunctional polyol such as epoxide polyether polyer (NOURYPOL 200 from Brian-Jones, United Kingdom), siloxane polymer including polydimethylsioxane (PDMS), hydroxyl-terminated polymers, copolymers such as hydroxyl-terminated polybutadiene, thiol, urethane, or urea groups or functional groups that can be converted into active hydrogen containing functional groups, such as carboxylic acid derivatives, for example, anhydride groups. In addition, a final substrate containing active hydrogen, such as hydroxyl groups (cotton, rayon and jute), amino groups (silk, nylon), or thiol groups (wool), may contribute, in full or partially, to this binding process and provide binding sites for the final image. The resulting ink is useful for methods of printing upon natural fabric substrates, or substrates comprising both natural and synthetic materials, including textile, fabric or fibrous materials where the reactive species are present within the substrate, or on the surface of the substrate.

One or more coreactants may be used. The coreactant may serve as a nucleophilic compound capable of being crosslinked through active hydrogen containing groups, and may assist in achieving a lower chemical reaction energy requirement or heat requirement, and shorten the time for the desired crosslinking and bonding reaction of the ink or toner and/or between the ink or toner with the substrate. For example, a polyether coreactant may help decrease the deblocking or blocking agent disabling energy and lower the crosslinking temperature of alcohol blocked aromatic polyisocyanate, aliphatic diamine coreactant may help the crosslinking of phenol blocked aromatic polyisocyanate. Carbamate and secondary carbamate help the crosslinking of melamine resins such as melamine-formaldehyde resins.

The proportions of the two reactive species may be present in a stoichiometric balance of reactive components. For example, the ratio of equivalents of isocyanate groups to the equivalents of active hydrogen-containing functional groups, depending on the functionality of the substrate, may range from 0.1:1 to 100:1, and may be 2:1.

In another embodiment, the toner or ink may be comprised of a crosslinking compound or compounds containing functional groups that react with active hydrogen, while the substrate contains a compound or compounds containing active hydrogen. For example, the toner or ink may contain isocyanate groups, and the final substrate contains active hydrogen, such as cellulose. As an extension of this concept, the toner or ink may contain a compound or compounds containing active hydrogen, while the substrate contains a compound or compounds with functional groups that react with active hydrogen. Such an ink-substrate combination is especially helpful in generating an 3-dimensional crosslinking structure between the ink and the substrate where small fibrous lint may participate in crosslinking, and reducing or eliminating fibrillation.

In still another embodiment, the two reactive groups may be present in separate toners or inks, in order to prevent premature or undesired activation or reaction of crosslinking or bonding. For example, one inkjet printhead may print ink with an ingredient or ingredients having functional groups that react with active hydrogen, while another printhead may print an ingredient or ingredients containing active hydrogen. To achieve a highly cohesive image with reduced printing defects, while also producing image integrity and durability, at least one of the two reactive components may exist in each of the inks that comprise colorants, as well as in the colorless ink.

A video camera or scanning device may be used to capture an image. The image is provided to a computer. The computer directs a digital printer, which may be an ink jet printer or an electrographic device, such as a laser printer or photocopier, to print the image. Other means of forming an image may be used, including images generated by software. Available computer design graphic software may be used, or still photography may be used. The design may be photographic, graphic artistic, or simply letters or words. The use of cyan, yellow and magenta toner compositions allow the printer to print in full color, or multi-color, designs. An optional black toner may be used. In addition, spot colors may be used to increase the color gamut.

An image is printed either directly on the final substrate, or is printed on an intermediate substrate, and subsequently transferred. The substrate may be comprised of materials that can be printed upon by an inkjet device, such as a continuous inkjet, drop-on-demand inkjet device such as thermal or bubble inkjet printer, a mechanical or electro-mechanical digital printing or coating device, or a piezoelectric inkjet printer.

In direct printing, the inks or toners may be printed directly onto the substrate without substantially activating the reactive components (reagents) at the time of printing. Aqueous, non-aqueous or sol-gel type forms of ink may be used. When aqueous or alcohol-containing ink is used, the available reactive functional groups, such as the hydroxyl groups, are increased through a swelling process by the printed ink. Better reactivity is achieved, and improved image fastness results upon crosslinking and/or curing. This is especially beneficial for substrates such as cotton, silk, wool, jute fabrics, where the participation in the crosslinking reaction of the microfibers at the surface of the substrate may substantially impact the image quality of the print. Inks of different types may also be used. For example, an aqueous based reactive ink without colorant may be printed to swell the fibrous materials of the substrate and eliminating air bubbles, followed by printing a sol-gel type of ink comprising colorants to achieve both defect-free printing and superior color vividness upon fixing or activation of the ink.

In another embodiment, a crosslinking agent such as polycarbodiimide may be stable in a water-free carrier, and may be printed without other active hydrogen components being present in the ink. Printing is carried out by one printhead, prior or after the printing of other inks that are printed by other printheads, to obtain activation and crosslinking. Many of the suitable functional groups are very reactive at ambient temperature, and will initiate curing and crosslinking upon contact. This configuration allows reactive ink ingredients to be separated and printed without initiating the curing or crosslinking reaction.

To further prevent premature or undesired reaction, the functional groups of crosslinkable compounds or ingredients may be protected either by chemical blocking agents or by physical barrier such as encapsulation. Such protecting agents are preferably removed through an initiation process by the application of energy or heat, although other initiation processes include, but are not limited to, radiation, chemical reaction, pressure, and/or the combination thereof. Various printer platforms may be mixed and used in the present invention, for example, a combination of an electrographic printing device and a piezoelectric inkjet printing device.

In transfer printing, once the image is printed onto an intermediate substrate, the image may be immediately and permanently transferred onto a final substrate, or the image may be transferred from the intermediate substrate to the final substrate at a later time. The design may be transferred onto a textile substrate, such as a shirt, or onto other substrates, such as metal, ceramic, wood, or plastic. A wide selection of preferred final substrates is possible, including, but not limited to, textiles, and especially natural, semi-synthetic or synthetic materials. Examples of natural textile materials include wool, silk, hair and cellulosic materials, particularly cotton, rayon, jute, hemp, flax and linen. Examples of synthetic and semi-synthetic materials include polyamides, polyesters, polyacrylonitriles and polyurethanes. Textile materials may be a blend of natural and synthetic fibers. When transfer printing, a release paper may be used that is coated with a low surface energy material, for example, a silicone polymer or fluorocarbon resin, such as polytetrafluoroethylene, and/or a release agent, such as carboxymethlycellulose. "Release force" describes the required force to remove a layer from the liner/base sheet, and may be subjectively described as 'easy' or 'tight'. The release force may be adjusted by coating formulations and resulting polymer characteristics, or by coat weight. Optimally, the release force is such that it is high ('tight') enough such that the ink or toner adheres during and after the fusing step in the printer and any subsequent handling of the printed image, but not so high that the ink or toner is not substantially released from the sheet during transfer to a final substrate ('easy release').

In order to prevent premature or undesired reaction of the reactive components, one or more blocking or protecting agents may also be employed. Blocking agents provide protection for the reactants and may be removed or disabled by the application of energy, which may be heat, during the transfer or fixing step of the process The ink or toner is fixed onto the final substrate by removing protecting agent(s) on the reactive components by the application of energy, such as heat, hot steam, radiation, or pressure, or a combination of these, and allowing the first and second reactive species to react with each other and/or active hydrogen-containing groups on the final substrate. For example, the transfer step may be accomplished in this example by the application of heat at 200° C., and the simultaneous application of pressure, for twenty (20) seconds.

The choice of protecting agents may depend upon the printer device to be employed. The blocking agent may have an unblocking (disabling) temperature below the printer's operating temperature, and the choice of blocking agents may depend not only upon the printer operating temperature, but the length of time the ink or toner is exposed to the operating temperature (dwell time). Examples of protected electrophilic reactive ingredients are internally (also known as blocking agent-free) and externally blocked polyisocyanates. An example of an internally blocked polyisocyanate is the isophorone diisocyanate (IPDI) product, Crelan VP LS 2147 from Bayer. Common examples of external blocking agents include phenols and substituted phenols, alcohols and substituted alcohols, thiols, lactams, mercaptans, primary and secondary acid amides, imides, aromatic and aliphatic amines, active methylene compounds, oximes of aldehydes and ketones and salts of sulfurous acid. An example of an externally blocked polyisocyanate is the c-caprolactam blocked Vestagon EP B 1400 from CreaNova.

In one embodiment, the ink comprises colorants, carriers, humactants, co-solvents, surfactants or emulsifiers, and either or both active hydrogen and crosslinking reactive compounds or ingredients. Additional active hydrogen-containing ingredients and/or crosslinking agents may be stored in another ink reservoir to be printed by separate printhead. In an alternate embodiment, all of the active hydrogen ingredients such as polyol are contained in the ink while all of the crosslinking agents such as polyisocyanate are stored separately in another ink.

The colorants used in the inks may be dyes or pigments, or a combination of these colorants. Suitable dyestuffs include, but are not limited to pigments, surface modified pigments from chemical grafting, self-dispersing pigments, chemically or physically encapsulated pigments, Acid Dyes, Direct Dyes, Reactive Dyes, Basic Dyes, Solvent Dyes, Disperse Dyes, Reactive Disperse Dyes, Sulphur Dyes, or Vat Dyes, or a combination thereof. Preferred are colorants containing a hydroxyl, amine, carboxylic, or other active hydrogen containing functional group that is capable of reacting with an electrophilic cross-linking agent without altering the desired hue. More preferred are those that contain at least one alkoxy or alkylamino group. Examples of such colorants include Disperse Red 55, Solvent Red 117 and Disperse Blue 3. Other examples are described, for example, in U.S. Pat. Nos. 4,749,784 and 6,159,250. These colorants may be used as a single component, or mixed with more than one colorant of the same or different types, along with the rest of the toner or ink ingredients, to enhance the application quality. Pigments and dyes may be incorporated into a flush resin system for easier dispersion within the toner system. Examples of flushed colorants are Sun Phthalo Blue-Green Shade 15 and Sun Diaryl Yellow AAOT 14 (Sun Chemical), and Hostacopy E02-M 101 Magenta (Clariant). The inks may contain from 0-30% colorant. Colored ink will preferably contain between 4-15% colorant by weight.

Disperse colorants, or sublimation colorants, are examples of heat activated dyes that generate vivid and intense color images when printed or dyed onto certain synthetic materials. The translucent nature of the colorants, when activated properly on the synthetic materials, allow the incident radiation to pass partially through the printed substrate, with the colors reflected and diffracted to generate enhanced color depth and esthetic color effects. These colorants should not be materially covered or obstructed by opaque colorants, fabric materials or polymer materials that materially interfere with the reflection of light.

In one embodiment, a reactive ink or toner comprises at least one disperse or sublimation colorant. A transparent or translucent polymeric material is also provided, to which the colorant has an affinity. The polymeric material may be provided in the ink. The ink may be printed on the surface of the substrate, or over an image printed by a first layer of ink that contains a pigment that is either opaque or translucent. Upon activation, both curing or crosslinking of the reactive ink and the sublimation colorant take place to create intense and vivid color images on the final substrate. This combination yields a superior image quality, as compared to the use of a reactive ink with a colorant other than sublimation or disperse dye, particularly with regard to color intensity when the substrate is natural fibrous material such as cotton, silk, wool, jute, etc. Image fastness is typically improved over the use of sublimation colorants alone. Most preferably, one the reactive ingredients is a reactive polymeric material with affinity to disperse dye or sublimation dye.

Suitable disperse or sublimation colorants for the process of the present invention include anthraquinone, azo, diazo, quinonline, oxazine, coumarin, xanthene, benzimidazole, diphenylamine, and the like. Specific examples of these colorants include, but are not limited to, disperse yellow 54, disperse yellow 241, disperse yellow 243, disperse orange 1, disperse orange 3, disperse orange 11, disperse orange 155, disperse red 1, disperse red 4, disperse red 11, disperse red 364, disperse red 60, disperse red 91 and 92, disperse red 368, disperse blue 3, disperse blue 14, disperse blue 26, disperse blue 35, disperse blue 56, disperse blue 60, disperse blue 72, disperse blue 79, disperse blue 87, disperse blue 165, disperse blue 183, disperse blue 359, disperse violet 17, disperse violet 33, disperse violet 63, disperse green 6, disperse blue 9, disperse brown 1, disperse brown 9, disperse brown 24 to 27, disperse black 1, disperse black 9, and the combination of these colorants. Those colorants are sometimes described as "disperse dyes" in Colour Index, Third Edition (Fourth Revision 1992), and may be suitable as disperse or sublimation colorants according to the present invention. Certain solvent dyes may also be used either alone, or in combination with disperse or sublimation colorants, such as Solvent Red 155. Preferably, the disperse or sublimation colorants are free from sulfo and/or carboxylic functional groups and with molecular weight no higher than 1000, most preferably no higher than 600.

Polymeric or synthetic materials such as polyester, modified polyester of either aliphatic or aromatic, and either straight chain or branched polyamides and modified polyamides, polyurethane, polyester polyurethane, polycarbonate and the like may be used where an affinity of the polymeric or synthetic material to disperse or sublimation colorants presents upon heat activation or sublimation process. Reactive polymeric or synthetic materials of these materials are especially desirable due to their crosslinking capability and affinity towards disperse or sublimation colorants. Reactive functional groups of these polymeric materials participate in the crosslinking reaction with both reactive colorants, such as reactive dyes, acid dyes, basic dyes, vat dyes, and/or grafted reactive pigments, and functional groups from the final printing substrate. Substantially decreased surface fibrillation is achieved, and improved image fastness and permanence results. The affinity of disperse dyes or sublimation dyes to the polymeric materials improves color intensity and visual appearance. Examples of such materials include polyester polyol, such as polyethylene adipate (PEA), polytetramethylene adipate (PTMA), polycaprolactone (PCL), caprolacone polyester polyol (e.g. CAPA 2043, 2054, 3031, 3022, 3050, 3091, 4101 from Brian-Jones of United Kingdom), polyester polyamine, polyamide, unsaturated polyester, polymer with aminoester or hydroxyl aminoester functional groups or pendants, ethylene vinyl acetate (EVA) homopolymer or copolymer, reactive polyurethane, self-crosslinking polyurethane, hybrid polyurethane such as acrylic or polyacrylic polyurethane, acetoacetoxy (AcAc) functional polymers or resins such as acetoacetoxyethyl acrylate (AAEA) and acetoacetoxyethyl methacrylate (AAEM). Water-soluble/water-reducible, and solvent-soluble, or solvent-less plasticizer polymeric materials may be used. Solution, emulsion or microemusion/macroemulsion, natural or synthetic polymerized latex, colloidal, or sol-gel system comprising these polymers may also be used for the desired ink or toner. Preferably, the molecular weight of the polymeric or resinous material with affinity toward disperse or sublimation colorants is from 3,000 to 500,000 and with glass transition temperature ($T_g$) of no higher than 220° C. Most preferably, a molecular weight from 5,000 to 100,000 and a glass transition temperature ($T_g$) of no higher than 60° C. may be used.

The disperse or sublimation colorants may be activated by heat or by radiation. Depending on the activation or sublimation energy level required by a colorant, the ink may be activated at a temperature from 100 to 240° C. However, a pre-conditioned polymer/colorant ink may substantially decrease the energy level for activation. In such a pre-conditioned ink, disperse or sublimation colorants are activated and bond with the polymer in the same ink prior to, or during, the printing process, allowing activation at a much lower energy level, or even at ambient temperature conditions. A lower curing or crosslinking temperature may be advantageous for thermal energy efficiency, and may also reduce depreciation to the final print substrate from exposure to heat and/or radiation. When two layers of ink are used, it is preferred that the inks cure and crosslink at the generally the same rate and efficiency to minimize printing defects.

The inks may comprise a binder component. Typically, the ink binder is the "glue" that holds the ink onto the substrate. Binders can be a single resin or a complex combination of resins, plasticizers, and other additives. Binders impact the viscosity of the system and promote droplet formation. The binder also serves to adhere the colorant to the surface of the substrate, control the gloss of the colorant, control the definition of the print of the colorant, and determine the alkali solubility of the ink, among other purposes. The binders are preferred to be film forming, amorphous, low odor, colorless or pale, transparent. The binders are either soluble or form a stable emulsion or colloid in the carrier system where surfactants, emulsifiers, humactants and/or co-solvents may be used in the ink. Either structured or random polymers may be selected for use as ink binders. Structured polymers have a block, branched, or graft structure. Particularly preferred are active hydrogen functional binders that can participate in the bonding/crosslinking of the reactive ink. These reactive groups may be protected with blocking agents.

Aqueous ink formulations contain water as the majority ink carrier. Therefore, binders used in aqueous ink formulations should be water soluble, dispersible or emulsifiable polymers and copolymers. Examples of such binders include phenolics; acrylics such as poly(meth)acrylic acid and salts, polyacrylamide, polystyrene-acrylates; vinyl resins such as polyvinyl alcohol, polyvinyl acetate, and polyvinyl butyral; polyalkyleneoxides such as polyethylene oxide and polyethylene glycol; polyamides; polyamines such as polyvinylpyridine, polyvinylpyrrolidone, polyvinylamine, and polyethyleneimine; cellulose derivatives such as nitrocellulose, ethyl cellulose, ethyl hydroxyethyl cellulose, cellulose acetate butyrate, cellulose acetate propionate, and sodium carboxymethyl cellulose.

Other aqueous ink additives such as water miscible humectants, co-solvents, wetting agents, emulsifiers, solubilizers, charging agents, and dispersants may be used to assist in creating a stable emulsion or colloid of hydrophobic components in the ink suitable for either of the previous mentioned printing systems. Co-solvents may serve several functions. They may act as chain extenders that participate in the crosslinking and bonding reaction. The co-solvents may have two or more functional groups with active hydrogen such as diol, triol, polyol, diamine and polyamine. They act as humectants, i.e. they help minimize the evaporation of water and prevent crystallization of the dye/pigment inside the ink jet nozzle. Co-solvents may further help control viscosity and the surface tension of the inks, two very important parameters. The preferred co-solvents used in this invention include but not limited to N-methylpyrrolidone/pyrrolidinone and glycols, particularly ethylene glycol such as LEG-1 and LEG-7 (both by Lipo Chemicals), diethylene glycol, propylene glycol, etc., as well as the ethers of such glycols, particularly mono-alkyl ethers. Straight-chain ethers may be more effective viscosity-reducing agents than branched chain isomers, and their efficiency may increase with an increasing number of carbon atoms in the alkoxy groups.

Correctly selected co-solvents may improve the solubility of certain colorants. Furthermore, the use of co-solvents with relatively lower boiling temperature than water may also help improve the stability of the emulsion ink system for thermal or bubble-jet inkjet system. Such co-solvents enable the quick formation of vaporized bubbles, thereby preventing the breakdown of emulsion particles by the heat from the heating elements, while aiding in inhibiting blocked ingredients in the ink from being unblocked by exposure to heat during the printing process. Examples of such co-solvents include 1-methoxy-2-propanol, iso-propanol, and iso-butyl vinyl ether.

Wetting agents may include such compounds as fatty acid alkanolamides, oxyethylene adducts from fatty alcohols or fatty amines. Other surface tension modifiers and/or interfacial modifiers include but not limited to di-, triethanolamine, amine oxide, sulfonated alkyl/fatty ester, aromatic/alkyl phosphate ester.

Common aqueous-based dye/pigment dispersants include such compounds as lignin sulfonates, fatty alcohol polyglycol ethers, and aromatic sulfonic acids, for instance naphthalene sulfonic acids. Some dispersants are polymeric acids or bases which act as electrolytes in aqueous solution in the presence of the proper counterions. Such polyelectrolytes may provide electrostatic as well as steric stabilization of dispersed particles in the emulsion. Furthermore, they supply the ink with charging characteristics, if required by the printer application. Examples of polyacids include polysaccharides such as polyalginic acid and sodium carboxymethyl cellulose; polyacrylates such as polyacrylic acid, styrene-acrylate copolymers; polysulfonates such as polyvinylsulfonic acid, styrene-sulfonate copolymers; polyphosphates such as polymetaphosphoric acid; polydibasic acids (or hydrolyzed anhydrides), such as styrene-maleic acid copolymers; polytribasic acids such as acrylic acid-maleic acid copolymers. Examples of polybases include polyamines such as polyvinylamine, polyethyleneimine, poly(4-vinylpyridine); polyquaternary ammonium salts such as poly(4-vinyl-N-dodecyl pyridinium). Amphoteric polyelectrolytes may be obtained by the copolymerization of suitable acidic and basic monomers, for instance, methacrylic acid and vinyl pyridine.

Aqueous ink also contains pH modifiers; anti-foaming chemicals such as silicone oil emulsions; fusion control agents; corrosion inhibitors; fungicides; antifreeze agents, such as ethylene glycol, propylene glycol, glycerol or sorbitol; antioxidants; and UV-light stabilizers.

The aqueous ink additives may contain reactive functional groups to improve water resistance of the final image, since such additives are hydrophilic substances. Preferred additives are surfactants with active-hydrogen functional groups, and may be protected with blocking agents.

For non-aqueous ink formulations, the carrier may be based on organic solvents, such as hydrocarbon, alcohol, glycol ethers, glycol esters, ketone, orester solvents. Alternately, the carrier may be based on natural or synthetic drying or nondrying oils. Preferably reactive carriers with nucleophilic functional groups containing active hydrogen are to be used in order to enhance reactivity and to reduce solid percentage. Binders used in such inks must be soluble or emulsifiable in these carriers. The ink binder may include resins, plasticizers, and waxes. Typical resins include phenolic resins, rosin modified phenolic resins, alkyd resins, hydrocarbon resins, polystyrene resins and copolymers, terpene resins, silicone resins, alkylated urea formaldehyde resins, alkylated melamine formaldehyde resins, polyamide and polyimide resins, chlorinated rubber and cyclized rubber, vinyl resins, ketone resins, acrylic resins, epoxide resins, polyurethane resins, and cellulose derivative resins. Other additives include surfactants, dispersants, antioxidants, light stabilizers, and drying oil catalysts.

For phase change, or hot melt, ink formulations, hot-melt carriers are used with combinations of hot-melt resins, wax or wax-like materials, tackifying agents, and plasticizers. These materials are solid in form at room temperature but become liquid at the temperature the printer operates, which is generally from 50 to 150 degrees C. Examples of phase change ink carriers include paraffins, microcrystalline waxes, polyethylene waxes, ester waxes, fatty acids, fatty alcohols, fatty amides (usually a mono-amide wax and a tetra-amide resin), sulfonamide materials, resinous materials made from different natural sources (tall oil rosins and rosin esters) and many synthetic resins, oligomers, polymers and co-polymers. A preferred tetra-amide resin is a dimer acid based tetra-amide that is the reaction product of dimer acid, ethylene diamine, and stearic acid. A preferred tackifier resin is a glycerol ester of hydrogenated abietic acid. Other additives may include binders, viscosity modifiers, light stabilizers, anti-oxidants and the like.

Viscosity control of liquid inks allows the ink to print through an inkjet printing device. The viscosity value of the ink may be, for commonly applied ink jet printers, in the range of 1-50 cps, and preferably within a range of 3-20 cps. Ink that is too viscous may result in printing difficulties, poor droplet size or shape forming and control, and/or damaged print orifices.

Surfactants may be used in the processes of wetting, emulsification, solubilization, ink drop forming and surface energy control or modification. Surfactants used for creating oil-in-water type emulsion may include anionic, cationic, nonionic and amphoteric surfactants with various molecular weight values. Surfactants used for non-aqueous based emulsion ink system are preferably the non-ionic type. Depending on the specific HLB (Hydrophillic Lipophillic Balance) values, some surfactants may also be called emulsifiers or emulsifying agents. High HLB value surfactants are generally used for emulsifying oil-in-water or aqueous type of systems, whereas low HLB value surfactants may generally be used to create water-in-oil or non-aqueous type of emulsion systems. Reactive surfactants may also be used. The reactive surfactants include hydroxyl, carboxylic, amine, amidal-terminated copolymeric surfactants.

When the surfactant/emulsifier concentration in a liquid carrier exceeds its critical micelle concentration (CMC), the molecules of the surfactant/emulsifier begin to aggregate. Aggregation of surfactants/emulsifier along with other ingredients forms micelles or reverse micelles, depending the main carrier phase is aqueous or non-aqueous, with a typical structure of non-soluble ingredient particles or aggregates surrounded by surfactant/emulsifier molecule layer. A homogenous, but multi-phase, system is therefore generated with small but isolated droplets of micelle carrying colorants, binders, miscible or non-miscible co-solvents and/or humectants, additives, etc. inside the micelle structure and suspending in the major carrier phase to prevent further aggregation or phase separation. These micelle particles are small enough in size to create a free flow liquid applicable in inkjet printing without clogging printing mechanism, and also protect the ingredients, especially the heat-sensitive materials inside the micelle particles having a direct contact with each other, and/or having a direct contact with printing mechanisms such as a heating element in thermal or bubble-jet inkjet printing. The non-soluble, non-miscible ingredients used in the application therefore can be stabilized with useable concentration.

In order to create a stable emulsion, micro/macroemulsion, colloidal, or a sol-gel ink system, surfactant/emulsifier may be used. Multiple surfactants/emulsifiers may also be used with combination to further enhance the protection, stability, flow characteristics, and printing performance, so long as such material does not have any negative impact on the reactive ingredients during the storage and image generating processes. Furthermore, depending on the CMC value, HLB value, and/or other characteristics of the surfactant/emulsifier, different concentration can be used in obtain best performance of the ink system corresponding to a specific printing mechanism.

Examples of surfactants and emulsifiers include alkylaryl polyether alcohol nonionic surfactants, such as Triton X series (Octylphenoxy-polyethoxyethanol); alkylamine ethoxylates nonionic surfactants such as Triton FW series, Triton CF-10, and Tergitol (Union Carbide Chemicals); polysorbate products such as Tween (ICI Chemicals and Polymers); polyalkylene and polyalkylene modified surfactants, such as Silwet surfactants (polydimethylsioxane copolymers) and CoatOSil surfactants from OSI Specialties; alcohol alkoxylates nonionic surfactants, such as Renex, BRIJ, and Ukanil; Sorbitan ester products such as Span and Arlacel; alkoxylated esters/PEG products, such as Tween, Atlas, Myrj and Cirrasol surfactants from ICI Chemicals and Polymers; unsaturated alcohol products such as surfynol series surfactants from Air Products Co., alkyl phosphoric acid ester surfactant products, such as amyl acid phosphate, Chemphos TR-421; alkyl amine oxide such as Chemoxide series from Chemron Corporation; anionic sarcosinate surfactants such as Hamposyl series from Hampshire Chemical corporation; glycerol esters or polyglycol ester nonionic surfactants such Hodag series from Calgene Chemical, Alphenate (Henkel-Nopco), Solegal W (Hoechst AG), Emultex (Auschem SpA); and polyethylene glycol ether surfactants such as Newkalgen from Takemoto Oil and Fat. Co. and other commercial surfactants known to the skilled in the art.

In addition to creating a stable emulsion or colloid ink system, surfactants are also used for surface energy or surface tension control. In either aqueous or non-aqueous case, the surface tension of the final ink should range from 20 dyne/cm to 55 dyne/cm and preferably from 35 dyne/cm to 45 dyne/cm.

The final transfer substrate may include plastics, metals, wood, glass, ceramics, paper, or textile materials. Preferred are textile materials including such materials as cotton, secondary cellulose acetate, rayon, wool, silk, and polyamides such as nylon 6, nylon 66 or nylon 12. The substrates must be able to withstand the heat transfer temperature without deforming, melting or degrading. The final substrate may either contain compounds that have groups containing active hydrogen or have a surface coating containing such groups. Chemical grafting is achieved through copolymerization between the ink layer components and final substrate material, resulting in superior stability and durability.

Thermally expandable ink may be produced in which the ink and/or the medium comprises an expanding agent. Simultaneous expanding and cross-linking gives a three-dimensional image which is permanently bound to the substrate. The height of the image is dependent on the concentration of expanding agent, the temperature and the pressure applied during heat transfer printing.

Preferable expanding agents include those which decompose upon heating to release gaseous products which cause the ink to expand. Such expanding agents, known as chemical blowing agents include organic expanding agents such as azo compounds which include azobisisobutyronitrile, azodicarbonamide, and diazoaminobenzene, nitroso compounds such as N,N'-dinitrosopentamethyl-enetetramine, N,N'-dinitroso-N,N'-dimethylterephthalamide, sulfonyl hydrazides such as benzenesulfonyl hydrazide, p-toluenesulfonyl hydrazide, p-toluenesulfonyl azide, hydrazolcarbonamide, acetone-p-sulfonyl hydrazone; and inorganic expanding agents, such as sodium bicarbonate, ammonium carbonate and ammonium bicarbonate. Such expanding agents may be dissolved or dispersed in the colored ink, in a separate ink reservoir, coated on the intermediate medium, or a combination of the above.

Thermally expandable ink may alternately be produced by the use of volatile hydrocarbons encapsulated in a microsphere that ruptures upon the application of heat. The gaseous products released expand the ink. These thermally expandable microcapsules are composed of a hydrocarbon, which is volatile at low temperatures, positioned within a wall of thermoplastic resin. Examples of hydrocarbons suitable for practicing the present invention are methyl chloride, methyl bromide, trichloroethane, dichloroethane, n-butane, n-heptane, n-propane, n-hexane, n-pentane, isobutane, isophetane, neo-pentane, petroleum ether, and aliphatic hydrocarbon containing fluorine such as Freon, or a mixture thereof.

Materials which are suitable for forming the wall of the thermally expandable microcapsule include polymers of vinylidene chloride, acrylonitrile, styrene, polycarbonate, methyl methacrylate, ethyl acrylate and vinyl acetate, copolymers of these monomers, and mixtures of the polymers of the copolymers. A crosslinking agent may be used as appropriate.

The microcapsules may be dispersed or emulsified in a colored ink, in a separate ink reservoir, coated on the intermediate medium, or a combination of the above. The diameter of the thermally expanded microcapsule is in the range of 0.01-20 microns, and preferably within a range of 0.1-5 microns, with a greater preference of a range of 0.1-1 microns.

It may be advantageous to include a catalyst to catalyze the cross-linking reaction and to help the control of the reaction of cross-linking or bonding of the image to the final substrate. Examples of catalysts include tertiary amines, such as triethylene amine, triethylenediamine, hexahydro-N,N'-dimethyl aniline, tribenzylamine, N-methyl-piperidine and N,N'-dimethylpiperazine; heterocyclic nitrogen compounds, such as 1,5-diazobicyclo[4.3.0]non-5-ene and diazobicyclo[2.2.2]octane; alkali or alkaline earth metal hydroxides; heavy metal ions, such as iron(III), manganese(III), vanadium(V) or metal salts such as lead oleate, lead-2-ethylhexanolate, zinc(II) octanoate, lead and cobalt naphthenate, zinc(II)-ethylhexanoate, dibutyltin dilaurate, dibutyltin diacetate, and also bismuth, antimony and arsenic compounds, for example tributyl arsenic, triethylstilbene oxide or phenyldichlorostilbene. Preferably, the current invention uses blocked catalysts that can catalyze a chemical reaction of cross-linking and bonding only at a desired condition reached. Examples of such blocked catalysts include but not limited to Nacure® 2547, Nacure® 4575, and Nacure® 4167 (King Industries). The use of catalyst is most desirable when the final activation condition is harsh and the final substrate is sensitive to such harsh conditions. Biological or enzymatic catalysts may also be used when the crosslinking or bonding reaction involves protein-containing materials, such as wool, silk, or soybean protein fibers (SPF).

The printing process produces a permanent image onto fibrous material, natural or synthetic, with the ink remaining in non-reacted form during printing, but which will cross-link and bond to a substrate upon activating the reactive components with energy, including heat, during fixing, or during a transfer process. In one embodiment, the ink comprises compounds with functional groups that react with active hydrogen, such as isocyanate, and compounds with functional groups containing active hydrogen, or functional groups capable of conversion to active hydrogen containing groups.

The ink may contain active polymeric or resinous material with functional groups to enhance the reactivity of cross-linking with the final substrate, as well as enhance the compatibility of the colorant to achieve outstanding color intensity and fastnesses. The ink may also be comprised of pigments, organic or inorganic, and/or dyes, such as medium to high energy sublimation, disperse dyes, dye diffusion, heat sensitive dyes, or other dyes, any of which may be referred to herein as colorants. Without delivering the ink material to non-imaged areas, the present invention may provide an imaging means onto fibrous material free of "hand" in the non-imaged areas hence substantially maintaining the original characteristics of the substrate and improving the final image quality.

The invention provides a method of imaging a substrate with commercially acceptable color vividness and color fastnesses. An embodiment of the ink, which may be a colorless ink, comprises reactive components, or the ink may comprise at least one transparent or translucent binding material that has an affinity with disperse or sublimation colorants, and at least one disperse or sublimation colorants, to cover the printed image. Upon drying or activating, an extra coverage of ink decreases fibrillation of the final substrate enhances the color spectrum reflection and diffraction of the printed image from all viewing angles, and improves the image durability and colorfastnesses.

What is claimed is:

1. A method of digital printing, comprising the steps of:
preparing a reactive ink comprising a first reagent;
supplying a digital printer with said reactive ink;
digitally printing said reactive ink on a substrate, wherein said first reagent reacts with a second reagent, and wherein a product of reaction of said first reagent with said second reagent is a polymeric material that is present on the substrate; and
digitally printing a heat activated colorant on said substrate, wherein said heat activated colorant has an affinity for the polymeric material, and the heat activated colorant binds to the polymeric material upon heat activation of said heat activated colorant.

2. A method of digital printing as described in claim 1, wherein said first reagent ink reacts with a second reagent to crosslink and bind the reactive ink to the substrate, and the crosslinking of the first reagent and the second reagent provides a polymeric material that is bound to the substrate.

3. A method of digital printing as described in claim 1, wherein the reactive ink comprises the second reagent.

4. A method of digital printing as described in claim 1, wherein the substrate comprises the second reagent.

5. A method of digital printing as described in claim 1, wherein the heat activated colorant is printed over the reactive ink after said reactive ink is printed.

6. A method of digital printing as described in claim 1, wherein said first reagent comprises a functional group that reacts with active hydrogen, and said second reagent comprises active hydrogen.

7. A method of digital printing as described in claim 1, wherein said heat activated colorant is a disperse dye.

8. A method of digital printing as described in claim 1, wherein said heat activated colorant is a sublimation dye.

9. A method of digital printing as described in claim 1, wherein said reactive ink further comprises a pigment.

10. A method of digital printing as described in claim 1, wherein the substrate comprises cotton, and wherein the reactive ink binds to the cotton.

11. A method of digital printing as described in claim 1, wherein said heat activated colorant forms a full color image on the substrate.

12. A method of digital printing as described in claim 1, wherein the heat activated colorant is printed over the reactive ink after said reactive ink is printed and after said first reagent reacts with the second reagent to produce the polymer for which the heat activated colorant has an affinity.

* * * * *